C. A. HERLE.
AIR COMPRESSOR.
APPLICATION FILED DEC. 29, 1913.
1,207,165.
Patented Dec. 5, 1916.
2 SHEETS—SHEET 1.
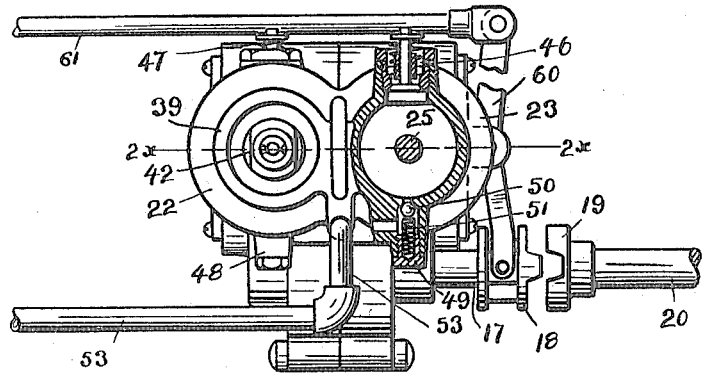
FIG. 1.
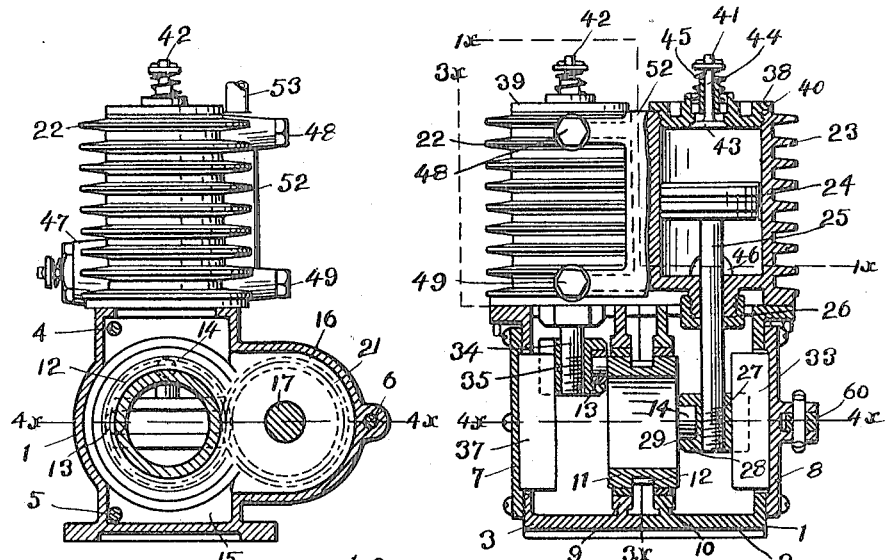
FIG. 3.
FIG. 2.
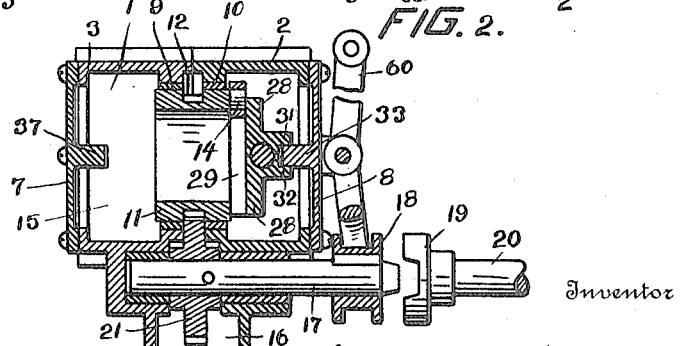
FIG. 4.
Witnesses
Eric Dohinger
Edna Booth
Inventor
Chester A. Herle
By Frank Keifer
Attorney C. A. HERLE.
AIR COMPRESSOR.
APPLICATION FILED DEC. 29, 1913.
1,207,165.
Patented Dec. 5, 1916.
2 SHEETS—SHEET 2.
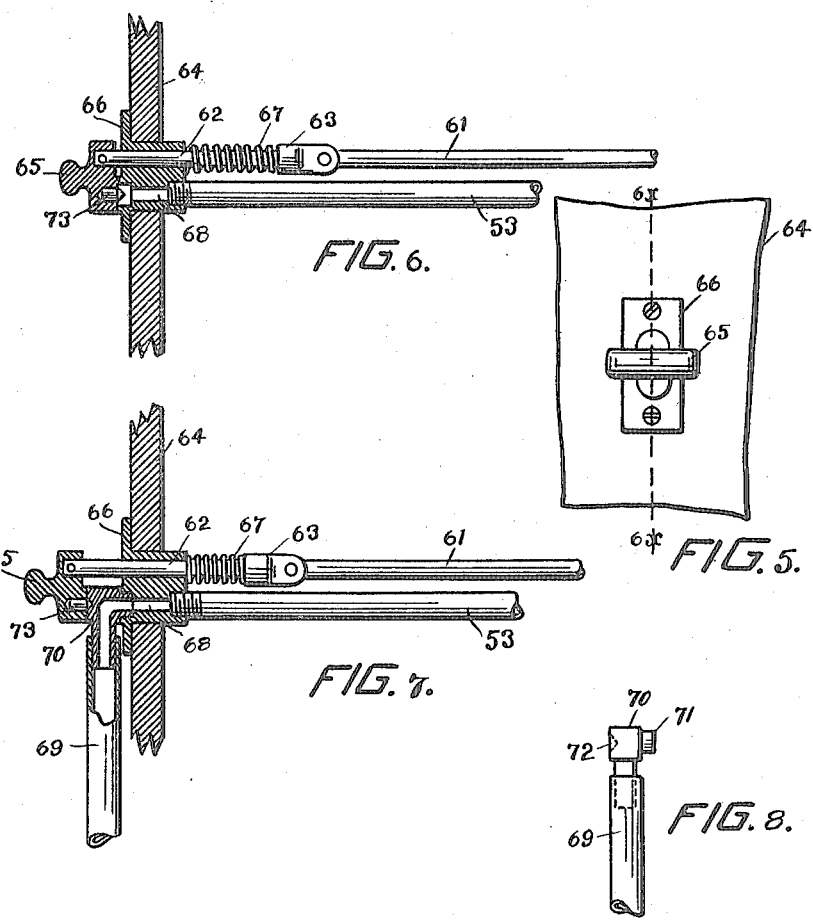
Witnesses
Eric Ischinger
Edna Booth
Inventor
Chester A. Herle
By Frank Keifer
Attorney

UNITED STATES PATENT OFFICE.

CHESTER A. HERLE, OF ROCHESTER, NEW YORK.

AIR-COMPRESSOR.

1,207,165.  Specification of Letters Patent.  Patented Dec. 5, 1916.

Application filed December 29, 1913. Serial No. 809,378.

*To all whom it may concern:*

Be it known that I, CHESTER A. HERLE, a citizen of the United States, residing at Rochester, in the county of Monroe and State of New York, have invented certain new and useful Improvements in Air-Compressors, of which the following is a specification.

The object of this invention is to provide an air compressor to be operated in connection with an automobile or in connection with gas engines or other machinery.

Figure 1 is a section on the line $1^\times$—$1^\times$ of Fig. 2. Fig. 2 is a sectional elevation on the line $2^\times$—$2^\times$ of Fig. 1, the left hand cylinder shown in Fig. 2 being shown in side elevation instead of in section. Fig. 3 is a section on the line $3^\times$—$3^\times$ of Fig. 2. Fig. 4 is a section on the line $4^\times$—$4^\times$ of Figs. 2 and 3. Fig. 5 is a front view of the handle for operating the clutch for driving the pump. Fig. 6 is a section on the line $6^\times$—$6^\times$ of Fig. 5. Fig. 7 is a section of the handle shown in Fig. 5, the handle being shown in operative position with the air hose connected. Fig. 8 is a detail view of the coupling for the hose.

In the accompanying drawings like reference numerals indicate like parts.

In the drawings 1 indicates the crank case which is divided into two sections 2 and 3, which sections are joined together by the bolts 4, 5 and 6. The ends of the crank case have handholes therein which are closed by the cover plates 7 and 8. Centrally of the crank case are the bearings 9 and 10, in which is mounted for rotation the crank disk 11. Centrally of this crank disk is provided the annular gear 12 and on the edges of this gear are provided the crank pins 13 and 14.

As shown in Fig. 3 the crank case has a main central portion 15, in which the crank disk is mounted for rotation, and the side chamber 16. The side chamber is perforated at one end for the power shaft 17 on the end of which is the clutch member 18 which is engaged by the clutch member 19 on the main power shaft 20 by which the shaft 17 is driven.

Keyed to the shaft 17 is the gear 21 which meshes with the gear 12 on the crank disk 11 and by which the crank disk is driven.

Mounted on the top of the main chamber 15 are the cylinders 22 and 23, the cylinder 23 being shown in section in Fig. 2, it being understood, however, that the cylinders are alike in all particulars. In the cylinder 23 operates the piston 24 to which is connected the piston rod 25, which passes through the stuffing box 26 in the end of the cylinder, the lower end of it being threaded at 27 and engaged with the cross head 28. This cross head has a horizontal slot 29 therein with which engages the crank pin 14 on the crank disk 11. As the crank disk 11 rotates the crank pin 14 rotates with it and by its engagement with the horizontal slot 29 communicates a reciprocating movement to the cross head 28, piston rod 25 and piston 24. The cross head 28 has the flanges 31 and 32 thereon which engage with the guide 33 integral with the cover 8 which holds it to a straight line movement as it travels up and down. The cylinder 22 is also provided with a similar piston to which is connected the piston rod 34, the piston rod 34 being in turn connected to the cross head 35 having a slot 36 therein with which the crank pin 13 engages for causing the reciprocation of the piston and piston rod. The cross head 35 is also provided with suitable flanges by which it can also engage the guide 37 on the cover plate 7 by which engagement it is also held to a right line movement as it reciprocates.

The cylinders 22 and 23 are provided with cylinder heads which screw in place, one of which cylinder heads 38 is shown in Fig. 2, the cylinder having a threaded engagement with the cylinder head. A similar cylinder head 39 is provided for the cylinder 32. Both of these cylinder heads have flanges thereon as shown at 40 in Fig. 2. These cylinder heads are provided with the valves 41 and 42, each of which comprises a disk 43, the cylinder head having a seat therefor. To the disk 43 is attached the valve stem 44 surrounded by the spring 45 fastened to the upper valve stem in any suitable manner and by the expansion of the spring the valve is held upon its seat. The valves 42 and 43 are admission valves. As each of these pumps is a double acting pump, admission valves must be provided on both sides of the pistons. A similar valve is therefore provided at 46 for the cylinder 23 and at 47 for the cylinder 22. Outlet valves are provided in each cylinder at 48 and 49, each of which outlet valves comprises a ball 50 held in place by the spring 51. The valves 48 and 49 in each cylinder have the ports 52 leading therefrom to the outer end of which port the tube 53 may be connected for conveying the air compressed by the pump. A single tube suffices to convey the compressed air from the four valves of the two pumps.

The foregoing parts are assembled by first putting the crank disk 11 into its bearing in section 2 of the crank case, at the same time also putting the gear 21 into its proper position in mesh therewith. The shaft 17 is then inserted into engagement with the gear 21 and pinned thereto. Next the section 3 of the crank case is joined to the section 2 by the bolts 4, 5 and 6. The cylinders 22 and 23 are prepared by putting the pistons and piston rods in place therein and adjusting the stuffing box thereon. The cylinders are then put in place on the crank case. The cross heads are then inserted in the crank case through the handholes and the pistons and piston rods are turned by a spanner until they make a complete threaded engagement with the cross heads, which cross heads are set so as to engage the crank pins on the crank disk. The cover plates 7 and 8 are then put on the ends of the crank case with their guides in engagement with the flanges on the cross heads. Pivotally mounted upon the cover plate 8 is the operating lever 60, which at one end connects with the clutch member 18 and at the other end is engaged by the link 61 at the end of which is pivotally connected the rod 62 which has a shoulder 63 thereon. The rod 62 passes through the dashboard 64 of the automobile and has a handle 65 fastened on the outer end thereof. A suitable bearing block 66 may be placed in the dashboard of the automobile to give a bearing for this rod and a compression spring 67 is interposed between the shoulder 63 and the bearing block, which normally holds the connecting rod 61 in the position shown in Figs, 1, 4 and 6.

The tube 53 has a threaded engagement with the bearing block 66, the bearing block being perforated at 68 to permit the transmission of the compressed air. A tube 69 is provided through which the compressed air may be conveyed to the valves of the tires, which tube has a coupling 70 thereon, which coupling has a nose 71 thereon adapted to engage with a suitable recess in the bearing block. The coupling is made as follows: The handle 65 is drawn out to the position shown in Fig. 7 which throws the clutch, shown in Figs. 1 and 4, and starts the pump to operating. The handle is held in this position by the insertion of the coupling 70 into the bearing block which makes a choked fit therewith substantially air tight. The coupling 70 is recessed at 72 to receive a pin 73 on the handle 65 by which it is held in place by the expansion of the spring 67.

I claim:

1. In an air compressor the combination of a compressing device, means for driving said compressing device, a clutch for controlling said driving means, an outlet for the air compressed by said compressor, a device normally closing said outlet when the compressor is idle, means for connecting said device to said controlling means, said device being movable to uncover the outlet for the compressed air and move the controlling device to start the compressor.

2. In an air compressor the combination of a compressing device, means for driving said compressing device, a clutch for controlling said driving means, an outlet for the air compressed by said compressor, a device normally closing said outlet when the compressor is idle, means for connecting said device to said controlling means, said device being movable to uncover the outlet for the compressed air and move the controlling device to start the compressor, a coupling capable of attaching to said outlet, said coupling being held in place by said closing device.

3. In an air compressor the combination of a compressing device, means for driving said compressing device, a clutch for controlling said driving means, an outlet for the air compressed by said compressor, a device normally closing said outlet when the compressor is idle, means for connecting said device to said controlling means, said device being movable to uncover the outlet for the compressed air and move the controlling device to start the compressor, a coupling capable of attaching to said outlet, said coupling being held in place by said closing device, said coupling serving to hold the controlling device in operative position.

4. In an air compressor the combination of a crank case divided vertically into two symmetrical parts, a bearing in each of said parts, a crank disk mounted in said bearings, said crank disk having a gear placed centrally therein between said bearings, a power shaft mounted at the side of said gear and having a pinion thereon meshing with said gear, said power shaft being parallel to the axis of said crank disk, openings at the opposite ends of said crank case, plates covering said openings, guides mounted on said cover plates.

5. In an air compressor the combination of a crank case divided vertically into two symmetrical parts, a bearing in each of said parts, a crank disk mounted in said bearings, said crank disk having a gear placed centrally therein between said bearings, a power shaft mounted at the side of said gear and having a pinion thereon meshing with said gear, said power shaft being parallel to the axis of said crank disk, openings at the opposite ends of said crank case, plates covering said openings, guides mounted on said cover plates, a cross head placed between each guide and the crank disk and having sliding engagement with both guide and crank disk.

6. In an air compressor the combination of a crank case divided vertically into two symmetrical parts, a bearing in each of said parts, a crank disk mounted in said bearings, said crank disk having a gear placed centrally therein between said bearings, said gear being of smaller diameter than the crank disk and bearings therefor, a power shaft mounted at the side of said gear and having a pinion thereon meshing with said gear, said power shaft being parallel to the axis of said crank disk, said pinion engaging with said gear between the bearings and the edges of the crank disk and serving to hold the crank disk in place.

7. In the driving mechanism for an air compressor, the combination of a crank case, said crank case being composed of two sections, each of said sections having a bearing at either end thereof, a crank disk mounted to rotate in said bearings, a gear wheel cut into the middle of said crank disk, said bearings for said crank disk being spaced apart to allow said gear wheel to rotate between them, a pinion mounted on a power shaft meshing with said gear wheel, a crank pin on each side of said crank disk engaging a cross head, a guide for each of said cross heads, said guides being fastened to the end of each section of said crank case.

In testimony whereof I affix my signature in presence of two witnesses.

CHESTER A. HERLE.

Witnesses:
 ERIC ISCHINGER,
 ALICE M. JOHANNS.

Copies of this patent may be obtained for five cents each, by addressing the "Commissioner of Patents, Washington, D. C."